United States Patent Office
2,931,819
Patented Apr. 5, 1960

1

2,931,819

MANUFACTURE OF VINYL ESTERS

John Edwin Oakley Mayne, Henry Warson, and Robert John Parsons, Carshalton, England, assignors to Vinyl Products Limited, Carshalton, England, a British company No Drawing. Application January 30, 1956
Serial No. 561,984

Claims priority, application Great Britain
February 3, 1955

11 Claims. (Cl. 260—410.9)

This invention is for improvements in or relating to the manufacture of vinyl esters and has for an object to provide an economical process for the manufacture of those vinyl esters of higher acids not ordinarily easily synthesised or not heretofore economically available.

One apparently simple way of obtaining such vinyl esters would be by means of an ester interchange reaction between a readily available vinyl ester of a lower fatty acid, such as acetic acid, and the higher molecular weight acid whose vinyl ester is required. However, Adelman, in the Journal of Organic Chemistry, volume 14 (1949), at page 1057, has concluded that the interchange of the vinyl group between a vinyl ester and an acid is different from the interchange reaction which occurs with other esters. The normal ester-ester or ester-acid interchange reactions occur readily in the presence of mineral acids or bases except when starting ester is a vinyl ester, in which case the reaction is catalysed by neither acids nor bases. It has been proposed to use various salts such as mercuric sulphate or phosphate but we have found that the use of mercury salts of aromatic sulphonic acids as catalysts for this reaction has the surprising result that ester interchange can be effected at temperatures as low as room temperature with yields as high as the theoretically possible yield.

According to the present invention, therefore, we provide a process for the manufacture of a vinyl ester which comprises effecting an ester interchange between a vinyl ester, particularly a readily available and comparatively cheap ester such as vinyl acetate, and an organic carboxylic acid containing from three to twenty-six carbon atoms by reacting the ester and acid together in the presence of a mercury salt (preferably a mercuric salt) of an aromatic sulphonic acid. The ester interchange reaction is preferably carried out in the presence of a polymerisation inhibitor, such as copper acetate, particularly when the reaction is carried out at elevated temperatures.

The carboxylic acids which may be employed in the practice of this invention may be either aliphatic or aromatic and may contain more than one carboxyl group and, if desired, an hydroxyl group or other substituent; the invention is more readily applicable to the manufacture of those acids containing less than twenty-two carbon atoms since it is difficult to effect a separation of the higher molecular weight esters from the acids due to their low volatility and consequently their high boiling points even under high vacua.

We have found that the most effective catalysts are the mercuric salts of aromatic sulphonic acids, especially p-toluene sulphonic acid, benzene sulphonic acid and naphthalene-2-sulphonic acid, prepared in situ from mercuric acetate and a slight excess over the equivalent amount of aromatic sulphonic acid. Only small amounts of these catalysts need be used, as little as 2% or less being desirable and effective.

An excess of the vinyl ester over the acid is desirable for the efficient interchange, vinyl acetate being used preferably in the ratio of at least three-and-a-half moles of the ester to one mole of the carboxylic acid.

We have discovered that while the reaction may be carried out at temperatures ranging from normal room temperature or even below, to the normal boiling point of the lowest boiling constituent in the mixture, which will usually be vinyl acetate or other starting ester, the rate of conversion increasing with rise in temperature, it is preferable to conduct the conversion at room temperature or just above in order to obtain the most efficient conversion without the formation of ethylidene diester type by-products in quantities sufficiently large to require elaborate separation from the desired vinyl ester product.

The reactions forming these by-products, at rates increasing with rise in temperature, may be represented in the case of the vinyl esters of higher fatty acids, as follows:

(I) 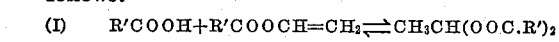

(II) 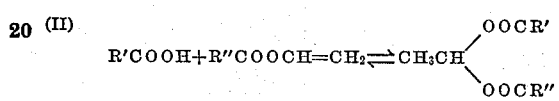

(III) 

(IV) 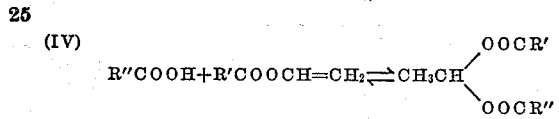

in which R'COO and R"COO represent the radicals of the lower and higher aliphatic acids respectively. When R"COO is the aromatic radical, the reactions are similar, involving addition across the —CH=CH$_2$ double bond, the hydrogen being attached to the =CH$_2$ group carbon atom.

Further, we have discovered that the conversion to the required vinyl ester sometimes reaches an optimum value before the whole of the original vinyl ester has reacted, after which the formation of the undesirable diesters becomes increasingly important. The optimum conversion value varies from one acid to another and also from one catalyst to another but the optimum point can be determined by testing the yield from time to time during the course of the reaction, conveniently by estimating the acetic acid produced from the original vinyl acetate for instance. Since the production of the by-products appears to be exothermic it may often be necessary to cool the reaction mixture to obtain the best yields.

The reaction is thus preferably stopped, for example by the addition of sodium acetate, at this optimum conversion value and the reaction mixture cooled down.

We have also discovered that the most satisfactory and economical method of separating the products of the reaction is by distilling off the excess starting vinyl ester of a lower fatty acid together with the fatty acid formed in the reaction from this starting ester, for example vinyl acetate and acetic acid, at atmospheric pressure, removing the last traces by distillation under slightly reduced pressure, finally distilling the desired vinyl ester from the residual material. This last distillation may be the normal vacuum distillation though we have discovered steam distillation to be quite as effective.

The following examples are illustrative of the invention, indicating certain embodiments of the procedure, the parts and percentages quoted being by weight and the yields given being calculated kinetically from the amount of acetic acid produced.

EXAMPLE I

Vinyl acetate (225 parts), capric acid (130 parts) and copper acetate (0.075 part) are heated with slow stirring under a reflux condenser to obtain a homogeneous mixture. The temperature is raised to the boiling point of vinyl acetate and a slight reflux is maintained in the reflux condenser. Mercury p-toluene sulphonate (4.5 parts) is then added and the conversion followed by removing samples periodically and estimating the acetic acid formed in the reaction. A conversion of 76.5%, based on the capric acid, was observed in two hours from the addition of the catalyst.

EXAMPLE II

Vinyl acetate (225 parts), capric acid (130 parts) and copper acetate (0.075 part) are heated with stirring under a reflux condenser as in Example I. Mercuric acetate (2.625 parts) is added at the reflux temperature followed a few minutes later by p-toluene sulphonic acid (2.85 parts). A conversion of 69.4%, based on capric acid, was observed in half an hour from the time of addition of the p-toluene sulphonic acid.

EXAMPLE III

Vinyl acetate (225 parts), capric acid (130 parts) and copper acetate (0.075 part) are heated to obtain a homogeneous mix, as in Example I, and cooled down to 30° C. Mercuric acetate (2.625 parts) is added, followed a few minutes later by p-toluene sulphonic acid (2.85 parts) and the mixture kept at 30° C. thermostatically. A conversion of 100% was observed in four-and-a-half hours from the addition of the p-toluene sulphonic acid.

EXAMPLE IV

Vinyl acetate (225 parts), capric acid (130 parts) and copper acetate (0.075 part) are heated with stirring to obtain a homogeneous mix, as in Example I, and then heated to obtain a slight reflux. Mercuric acetate (2.625 parts) is added followed by naphthalene-2-sulphonic acid (3.725 parts) and the mixture kept at a constant temperature throughout the reaction. A conversion of 72.6% was observed in one hour from the time of addition of the second catalyst.

EXAMPLE V

Vinyl acetate (225 parts), caprylic acid (109 parts) and copper acetate (0.075 part) are heated to obtain a homogeneous mix and then cooled to 30° C. The temperature is maintained at 30° C. throughout the reaction. Mercuric acetate (2.18 parts) is added, followed by p-toluene sulphonic acid (2.36 parts). A conversion of 65.6% in five hours was observed.

EXAMPLE VI

Vinyl acetate (225 parts), benzoic acid (91.5 parts) and copper acetate (0.075 part) are heated to obtain a homogeneous mix. The mix was then maintained at 60° C. throughout the reaction and mercuric acetate (1.83 parts) added, followed by p-toluene sulphonic acid (1.985 parts). A conversion of 70.4% in two hours was observed.

EXAMPLE VII

Vinyl acetate (225 parts), lauric acid (152 parts) and copper acetate (0.075 part) are heated to obtain a homogeneous mix and cooled to 30° C. Mercuric acetate (3.05 parts) is added followed by p-toluene sulphonic acid (3.30 parts). A conversion of 87.5% in five hours was observed.

EXAMPLE VIII

Vinyl acetate (225 parts), lauric acid (152 parts) and copper acetate (0.075 part) are heated to obtain a homogeneous mix and then maintained at 60° C. Mercuric acetate (3.05 parts) is added followed by p-toluene sulphonic acid (3.30 parts). A conversion of 100% in one-and-a-half hours was observed.

EXAMPLE IX

Vinyl acetate (225 parts), myristic acid (170 parts) and copper acetate (0.075 part) are heated to obtain a homogeneous mix and then maintained at 60° C. throughout the reaction. Mercuric acetate (3.39 parts) is added followed by p-toluence sulphonic acid (3.68 parts). A conversion of 77% in one-and-a-half hours was observed.

EXAMPLE X

Vinyl acetate (300 parts), adipic acid (73 parts), copper acetate (0.1 part) are heated to 60° C. and then maintained at this temperature throughout the reaction. Mercuric acetate (1.50 parts) is added, followed by p-toluene sulphonic acid (1.62 parts). The melting point of adipic acid being above the reaction temperature, the reaction mixture was initially non-homogeneous since the acid does not dissolve in the vinyl acetate but during the course of the reaction the adipic acid goes into solution and the reaction mixture becomes homogeneous. A conversion of 92% in five-and-a-half hours was observed.

EXAMPLE XI

Vinyl acetate (516 parts), sebacic acid (202 parts) and copper acetate (0.2 part) are heated to 60° C. and then maintained at this temperature throughout the reaction. Mercuric acetate (4.00 parts) is added, followed by p-toluene sulphonic acid (4.35 parts). In this example, as in Example X, the reaction mixture is initially non-homogeneous but becomes homogeneous during the course of the reaction. A conversion of 63.4% in five hours was observed.

EXAMPLE XII

Vinyl acetate (602 parts), distilled linseed oil fatty acids (290 parts) and copper acetate (0.1 part) are heated to obtain a homogeneous mix and thereafter maintained at 35° C. throughout the reaction. Mercuric acetate (23.2 parts) is added followed by p-toluene sulphonic acid (25.1 parts). A conversion of 87% in 3 hours was observed.

EXAMPLE XIII

Vinyl acetate (600 parts), distilled dehydrated castor oil fatty acids (280 parts) and copper acetate (0.15 part) are heated to obtain a homogeneous mix and then maintained at 50° C. throughout the reaction. Mercuric acetate (11.5 parts) is added followed by p-toluene sulphonic acid (12.4 parts). A conversion of 92% in 3½ hours was observed.

EXAMPLE XIV

Vinyl acetate (300 parts) behenic acid (340 parts) and copper acetate (0.1 part) are heated to obtain a homogeneous mix and thereafter maintained at 60° C. throughout the reaction. Mercuric acetate (6.8 parts) is added followed by p-toluene sulphonic acid (7.36 parts). A conversion of 80.5% in 1½ hours was observed.

EXAMPLE XV

Vinyl acetate (300 parts), stearic acid (282.5 parts) and copper acetate (0.1 part) were heated to obtain a homogeneous mix and thereafter maintained at 50° C. through the reaction period. Mercuric acetate (5.6 parts) is added followed by p-toluene sulphonic acid (6.06 parts). A conversion of 74.5% in 3 hours was observed. On re-catalysing with a further amount of mercuric acetate (2.8 parts) and p-toluene sulphonic acid (3.03 parts), a conversion of 96% in a total time of 6 hours was observed.

EXAMPLE XVI *Tetra vinyl pyromellitate*

Vinyl acetate (602 parts), pyromellitic acid (127 parts) and copper acetate (0.2 part) are heated together to obtain a homogeneous mix and thereafter maintained at 60° C. throughout the reaction period. Mercuric acetate (2.54 parts) is added followed by p-toluene sulphonic acid mono-hydrate (3.03 parts). A conversion of 95.5% in 3¼ hours was observed.

In the foregoing examples, all except Example XVI employ the anhydrous form of the aromatic sulphonic acid but it is to be understood that the hydrated form of the acids can be used as in Example XVI.

It may be further observed that it has been found advantageous to add the catalyst in stages during the course of the reaction. The most advantageous procedure appears to be to re-catalyse the reaction when it reaches the stage of optimum conversion and it is found that more than one further addition of catalyst may be desirable to obtain the maximum yields with the mimimum formation of by-products. The re-catalysing of the reaction is illustrated in Example XV in which a 96% yield is to be noted.

This procedure of re-catalysing the reaction may in some instances, at least, render it unnecessary to adopt the alternative procedure, referred to earlier herein, of stopping the reaction when the optimum conversion has been obtained.

The higher vinyl esters which are produced by the process of the present invention may be used, in addition to being converted to simple polymers, in the manufacture of copolymers, especially with vinyl acetate and with vinyl acetate together with other monomers such as maleate esters.

We have found such copolymers, in emulsion form, to be exceptionally useful in the manufacture of emulsion paints, owing to the high tensile strength, elongation, flexibility, gloss and clarity of the emulsion films, together with the highly important internal plasticisation properties of the higher vinyl esters eliminating the need for addition of external plasticisers and the associated disadvantage of plasticiser migration.

We claim:

1. A process for the manufacture of a vinyl ester which comprises effecting an ester interchange between vinyl acetate and an organic carboxylic acid containing from three to twenty-six carbon atoms by reacting the ester and acid together in the presence of a mercury salt of an aromatic sulphonic acid.

2. A process according to claim 1 wherein said mercury salt is a mercuric salt.

3. A process according to claim 1 wherein said organic carboxylic acid is an aliphatic acid.

4. A process according to claim 2 wherein said mercuric salt is formed in situ by interaction between mercuric acetate and an aromatic sulphonic acid.

5. A process according to claim 2 wherein said vinyl acetate is employed in excess of said carboxylic acid in the ratio of at least three-and-a-half moles to one.

6. A process according to claim 2 wherein said ester interchange reaction is carried out at a temperature below the normal boiling point of the lowest boiling constituent of the reaction mixture.

7. A process according to claim 6 wherein the temperature is maintained below 60° C.

8. A process according to claim 2 wherein the ester interchange reaction is stopped at the point of optimum conversion to avoid undue production of by-products.

9. A process according to claim 2 wherein the reaction mixture is recatalysed during the course of the ester interchange reaction.

10. A process for the manufacture of a vinyl ester which comprises effecting ester interchange between an organic carboxylic acid containing from three to twenty-six carbon atoms and an excess of vinyl acetate in the presence of a mercuric catalyst produced in situ by interaction between mercuric acetate and a slight excess thereover of an aromatic sulphonic acid, maintaining the reaction temperature at a value not exceeding 60° C. and adding further quantities of mercuric acetate and sulphonic acid during the course of the reaction.

11. The improvement in the manufacture of vinyl esters by the ester interchange reaction between a vinyl ester and an organic carboxylic acid in the presence of a mercuric salt as catalyst which comprises the use of a mercuric salt of an aromatic sulphonic acid as the catalyst.

References Cited in the file of this patent

UNITED STATES PATENTS

| | | |
|---|---|---|
| 2,249,768 | Kropa | July 22, 1941 |
| 2,299,862 | Toussaint et al. | Oct. 27, 1942 |
| 2,646,437 | Dickey et al. | July 21, 1953 |

FOREIGN PATENTS

| | | |
|---|---|---|
| 686,050 | Great Britain | Jan. 14, 1953 |

OTHER REFERENCES

Markley: Fatty Acids, 1947, page 292.

Groggings: Unit Processes in Organic Synthesis, 1952, pp. 597, 607, 608, 620.